United States Patent [19]
Ikeura et al.

[11] 3,962,867
[45] June 15, 1976

[54] SECONDARY AIR REGULATING SYSTEM

[75] Inventors: Kenji Ikeura, Yokohama; Yoshitaka Hata, Fujisawa, both of Japan

[73] Assignee: Nissan Motor Co., Ltd., Yokohama, Japan

[22] Filed: June 26, 1974

[21] Appl. No.: 483,289

[30] Foreign Application Priority Data
June 27, 1973   Japan.............................. 48-72678

[52] U.S. Cl................................. 60/276; 60/290
[51] Int. Cl.².................... F02B 75/10; F01N 3/10
[58] Field of Search..................... 60/289, 290, 276

[56] References Cited
UNITED STATES PATENTS

| | | | |
|---|---|---|---|
| 3,106,820 | 10/1963 | Schaffer............................... | 60/290 |
| 3,648,455 | 3/1972 | Muroki................................. | 60/290 |
| 3,665,711 | 5/1972 | Muroki................................. | 60/290 |
| 3,696,618 | 10/1972 | Boyd..................................... | 60/289 |
| 3,768,259 | 10/1973 | Carnahan............................ | 60/289 |

*Primary Examiner*—Douglas Hart

[57] ABSTRACT

A sensor such as an oxygen sensor or a carbon monoxide sensor generates an electrical signal responsive to the oxygen or carbon monoxide concentration in exhaust gases discharged from an exhaust purifying device. Under the control of the electrical signal regulating means the amount of secondary air to the exhaust purifying devices is regulated.

3 Claims, 4 Drawing Figures

SECONDARY AIR REGULATING SYSTEM

The present invention relates to a secondary air regulating system for an exhaust purifying device of an automotive internal combustion engine.

In connection with the problem of reducing air pollution resulting from the automotive internal combustion engine, it is well known in the art that an engine driven air pump supplies secondary air to an exhaust purifying device such as a catalytic converter or a thermal reactor for promoting oxidation purification of unoxidized noxious components in the exhaust gases discharged from the internal combustion engine.

However, in the prior art, difficulties are encountered in that an excess or unsatisfactory amount of secondary air is usually supplied into the exhaust purifying devices and therefore the secondary air supplied is not effectively utilized nor the noxious components in the exhaust gases completely purified.

It is therefore an object of the present invention to provide a secondary air regulating system by which the optimal amount of secondary air can be supplied for the exhaust purifying device.

It is another object of the present invention to provide a secondary air regulating system which regulates the amount of secondary air for the exhaust purifying devices in response to the nature of the exhaust gases discharged from the exhaust purifying devices.

These and other objects and advantages of the present invention will become apparent from the following description when taken in conjunction with the attached drawing, in which.

Figure 1:
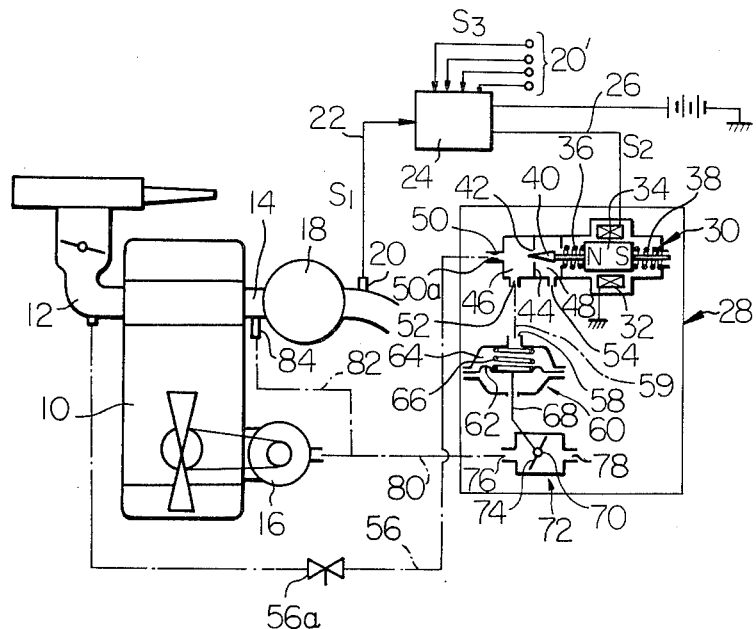
FIG. 1 is a schematic view showing an embodiment of a secondary air regulating system according to the present invention.

Referring now to FIG. 1, there is schematically illustrated an internal combustion engine having an exhaust purifying device, the engine is shown as being equipped with a secondary air regulating system embodying the present invention. The internal combustion engine 10 has, as customary, an air intake passage 12, an exhaust passage 14, and an air pump 16 which is driven by the engine 10. An exhaust purifying device or a thermal reactor 18 is installed in the exhaust passage 14 for purifying noxious and harmful components in exhaust gases from the engine 10 by means of oxidation thereof.

A sensor or oxygen sensor 20 is disposed downstream of the thermal reactor 18 in the exhaust passage 14 to generate an electric signal or first signal $S_1$ responsive to the oxygen concentration in the exhaust gases discharged from the thermal reactor 18. The oxygen sensor 20 includes any suitable electrodes formed on porous zirconia ceramic which can generate an electrical signal in response to the presence of oxygen. The sensor 20 may be a carbon monoxide sensor. The carbon monoxide sensor generates an electrical signal responsive to the electric resistance variation of a platinum wire which depends on the reaction heat generated by catalytic oxidation of carbon monoxide with the surface of the platinum wire. It is to be noted that the electrical signal from the carbon monoxide sensor indirectly represents the oxygen concentration since carbon monoxide concentration increases, as the oxygen concentration decreases. Such sensors as mentioned above are well known in the art.

The sensor 20 is electrically connected to a controller 24. The electrical signal, or the first signal $S_1$, is transmitted through a line 22 to the controller 24. The controller 24 may be any of the control devices known in the art which are utilized to control regulating means which will vary the amount of secondary air. The controller 24 is in turn electrically connected to a three-way solenoid valve 30 via transmitting line 26. The solenoid valve 30 forms part of regulating means 28. The controller 24 converts the first signal $S_1$ into an operating signal or the second signal $S_2$ and transmits the signal $S_2$ to the solenoid valve 30 through the line 26.

The three-way solenoid valve 30 includes a solenoid coil 32 which is connected to the controller 24 via the line 26 and has a bore formed inside thereof. An elongated plunger 34 made of a permanent magnet is slidably accommodated in the bore, and is biased at both ends thereof by springs 36 and 38 so as to be held in the neutral position when not actuated. The plunger 34 has a needle valve 40 which is so arranged to increase or decrease the opening area of an opening 42 through partition wall 44. The partition wall 44 defines a vacuum chamber 46 and an atmospheric chamber. The three-way solenoid valve 30 is provided with a vacuum inlet port 50 and a vacuum outlet port 52 both communicating with the vacuum chamber 46, and an air inlet port 54 which is disposed in the atmospheric chamber. The vacuum inlet port 50 is in communication with the air intake passage 12 through a conduit 56 for introducing vacuum from the passage 12, and has an orifice 50a inside thereof for flow restriction. The conduit 56 has a valve 56a for flow restriction. The vacuum outlet port 52 is in communication with a port 58 of a vacuum actuated diaphragm assembly 60 through a conduit 59 which forms part of the regulating means 28. The air inlet port 54 is in communication with the atmosphere for introducing atmospheric air.

The diaphragm assembly 60 includes a diaphragm member 62 which defines a chamber 64. The diaphragm member 62 is urged away from the port 58 by a spring 66 which is in the illustrated portion. The diaphragm member 62 of the diaphragm assembly 60 has a rod 68 which is in turn mechanically connected to a rotatable shaft 70 of a relief valve 72 which forms a further part of the regulating means 28. On the rotatable shaft 70, a butterfly valve member 74 is fixedly mounted. The relief valve 72 is provided with an air inlet 76 and air outlet 78 which is in communication with atmosphere. The air inlet 76 of the relief valve 72 is in communication with the air pump 16 via a conduit 80. The conduit 80 branches off and a branched conduit 82 leads to a portion upstream of the thermal reactor 18 in the exhaust passage 14 for providing secondary air through a supply nozzle 84 into the thermal reactor 18.

Figure 3:
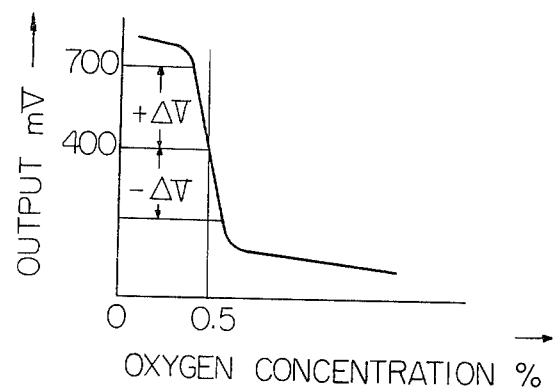
FIG. 3 is a graph illustrating a curve which indicates performance characteristic of an oxygen sensor of the arrangement shown in FIG. 1.

It should be noted that oxygen sensors having various kind of output characteristic are usable as the above-mentioned oxygen sensor 20. However, it is preferable to use a sensor having a characteristically large output variation near 0% of the oxygen concentration as shown in FIG. 3. In this instance, to control the oxygen concentration in the exhaust gases discharged from the thermal reactor 18 at a desired level, such as 0.5% by volume, the controller 24 is set so that 400 mV corresponds to 0.5% by volume oxygen concentration. Accordingly when the electrical signal, or the first signal $S_1$, is transmitted from the oxygen sensor 20 to the controller 24, the controller 24 is pre-set in such a manner as to register the deviation $\pm\Delta V$ from the set point of 400 mV and generate an electric operating signal, or a second signal $S_2$, which is proportional to the magnitude of the deviation $\Delta V$. The second signal $S_2$ is thereafter transmitted to the three-way solenoid valve 30 of the regulating means 28 for actuating thereof.

Figure 4:
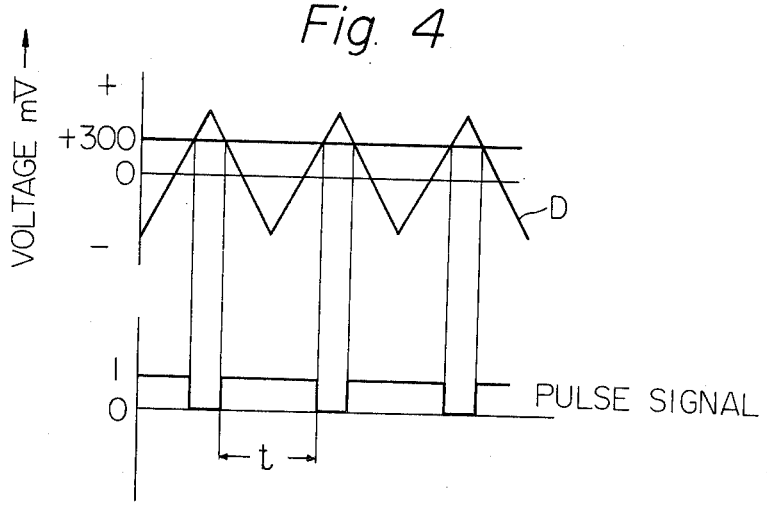
FIG. 4 illustrates the pulse signal preferably used in the controller of the arrangement shown in FIGS. 1 and 2.

The electric operating signal or the second signal $S_2$ is usually obtained by means of a simple amplification of the deviation $\pm\Delta V$. However, as shown in FIG. 4, the signal $S_2$ may be obtained by means of superposing a ramp wave dither D such as triangular wave and sawtooth wave on the input voltage signal $S_1$ from the oxygen sensor 20 and further converting into a pulse signal by means of any suitable pulse signal generator which pulse signal has the pulse interval t proportional to the magnitude of the deviation $\Delta V$. Since a control circuit having such a function is well known in the art, it has been omitted for the purpose of simplicity.

The operation of the secondary air regulating system as illustrated in FIG. 1 will now be explained.

When the oxygen concentration in the exhaust gases discharged from the thermal reactor 18 is at a predetermined adequate level no electrical operating signal is transmitted to the three-way solenoid valve 30. Accordingly, the plunger 34 of the valve 30 is held at the neutral position in the bore inside the coil 32. In this state, the needle valve 40 of the plunger 34 is so set as to form a predetermined opening area in the opening 42 for submitting atmospheric air from the inlet port 54 into the air chamber 46. Thus, a predetermined amount of the atmospheric air is introduced into the vacuum chamber 6 to hold the vacuum in the chamber 46 at the predetermined level. By the predetermined level of vacuum, the diaphragm assembly 60 is actuated so as to move the diaphragm member 62 toward the port 58 against the biasing force of the spring 66. Thus the rod 68 fixed to the diaphragm member 62 of the diaphragm assembly 60 in turn actuates the butterfly valve 74 of the relief valve 72 so as to bleed off a predetermined amount of secondary air from the air pump 16 whereby a predetermined amount of secondary air suitable for oxidation is supplied through the branched conduit 82 and supply nozzle 84 to the portion upstream of the thermal reactor in the exhaust passage 14.

When the oxygen concentration in the exhaust gases discharged from the thermal reactor 18 exceeds the predetermined level, the electrical operating signal $+S_2$ is transmitted from the controller 24 to the coil 32 of the three-way solenoid valve 30. The coil 32 is then energized with one polarity to move the plunger 34 in FIG. 1 in response to the magnitude of the signal $+S_2$ against the biasing force of the spring 36. The needle valve 40 integrated with the plunger 34 is moved so as to decrease the opening area of the opening 42 for restriction of air flow from the air inlet port 54 into the vacuum chamber 46. Accordingly, vacuum in the vacuum chamber 46 is increased in response to the magnitude of the signal $+S_2$. The increased vacuum actuates the diaphragm assembly 60 to increase the amount of air bleed from the relief valve 72 into the atmosphere. As a result, the air pump 16 supplies a decreased amount of secondary air through the branched conduit 82 and the supply nozzle 84 to the portion upstream of the thermal reactor 18.

On the contrary, when the oxygen concentration in the exhaust gases discharged from the thermal reactor 18 is lower than the predetermined level, an electrical operating signal $-S_2$ is transmitted from the controller 24 to the coil 32 of the three-way solenoid valve 30. The coil 32 is then energized with the reverse polarity of that in the case of signal $+S_2$ to move the plunger 34 in FIG. 1 in response to the magnitude of the signal $-S_2$ against the biasing force of the spring 38. The needle valve 40 integrated with the plunger 34 is moved to increase the opening area of the opening 42 for increasing the amount of air introduced into the vacuum chamber 46. Vacuum in the vacuum chamber 46 is accordingly decreased in response to the magnitude of the signal $-S_2$. The decreased vacuum actuates the diaphragm assembly to decrease the amount of the air bleed from the relief valve 72 into the atmosphere. As a result, the air pump 16 supplies the increased secondary air through the branched conduit 82 and the supply nozzle 84 to the portion upstream of the thermal reactor 18.

It will be seen that the plunger 34 of the solenoid valve 30 can be operated more smoothly and accurately by using the above-mentioned pulse signal as the operating signal, or the second signal $S_2$. Because the pulse signal operates the plunger 34 in such a manner as to reduce vibration and friction resistance between friction elements in the solenoid valve 30.

It will be noted that the optimum amount of secondary air to be supplied for exhaust purification should be regulated in response not only to the oxygen concentration in the exhaust gases discharged from the exhaust purifying device but also to the other operating conditions of the motor vehicle such as the engine and exhaust temperatures, and the acceleration and deceleration. For example, during warming up of the engine, the secondary air to be supplied should be increased for quick elevation of the purifying device temperature, on the contrary after elevation of the purifying device temperature, the secondary air should be decreased. During rapid acceleration or deceleration of the vehicle, the secondary air should be rapidly increased and decreased.

To meet such requirements, the controller 24 may further be electrically connected to a group of sensors 20' which generate a group of signals or the third signal $S_3$ representing the operating conditions such as the engine and exhaust temperatures, and the acceleration and deceleration of the vehicle. Accordingly, the controller 24 may generate the operating signal or the second signal $S_2$ in response to both the above-mentioned operating condition of the vehicle and the oxygen concentration in the exhaust gases discharged from the exhaust purifying device 18. Since a control circuit having such a function is well known in the art, it has been omitted for the purpose of simplificy.

It is possible to install the relief valve 72 in the branched conduit 82 leading to the exhaust passage 14 for direct regulation of the secondary air, though it is installed in the conduit 80 extending from the air pump 16 in the embodiment shown in FIG. 1.

Figure 2:
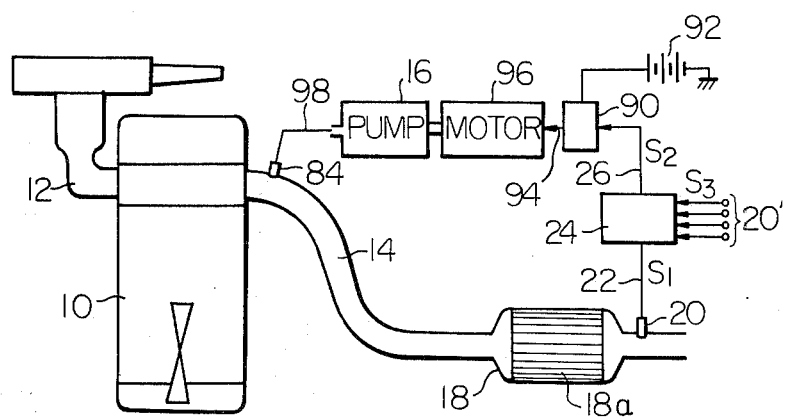
FIG. 2 is a schematic view showing another embodiment of a secondary air regulating system according to the present invention.

FIG. 2 illustrates another embodiment of the present invention, which is essentially similar to that shown in FIG. 1 and, as such, like numerals are assigned to corresponding parts.

As shown, an internal combustion engine has, as customary, an air intake passage 12 and an exhaust passage 14. An exhaust purifying device or a catalytic converter 18 having a catalyst 18a is installed in the exhaust passage 14. A sensor or a carbon monoxide sensor 20 is disposed downstream of the catalytic converter 18 in the exhaust passage 14 for generating an electrical signal or the first signal $S_1$ in response to the concentration of carbon monoxide or oxygen shortage in the exhaust gases discharged from the catalytic converter 18. The first signal $S_1$ is transmitted through a line 22 to a controller 24. The controller 24 amplifies and converts the first signal $S_1$ into the second signal $S_2$ which is in turn transmitted through a line 26 to an electrical voltage regulator 90 as a regulating means of the present invention.

The voltage regulator 90 controls a voltage from an electric source 92 in response to the magnitude of the second signal $S_2$ and supplies it into an electric motor 96. The electric motor 96 is drivably connected to an air pump 16. The air pump 16 supplies secondary air through a conduit 98 from the supply nozzle 84 to a portion upstream of the catalytic converter 18 in the exhaust passage 14. Accordingly, as the concentration of carbon monoxide in the exhaust gases discharged from the catalytic converter 18 increases, the rotation of the electric motor 96 increases and the air pump therefore supplies secondary air proportionally to the concentration of carbon monoxide in the exhaust gases discharged from the catalytic converter 18. Also in this embodiment shown in FIG. 2, a group of signals or the third signal $S_3$ representing various operating conditions may be transmitted into the controller 24 in addition to the first signal $S_1$ representing carbon monoxide concentration.

It will be understood that the secondary air regulating system according to the present invention is effectively applied also to an exhaust purifying system having a multi-functional catalytic converter which acts as an oxidation catalytic converter for oxidizing carbon monoxide and hydrocarbons etc. and a reducing catalytic converter for reducing nitrogen oxides in the exhaust gases. In addition, the secondary air regulating system is easily applied to an exhaust purifying system having a plurality of purifying devices to distributively supply secondary air from an air pump into the plurality of purifying devices.

It will also be understood that the present invention is not limited beyond the scope of the hereinafter appended claims, and that further embodiments and modifications of the invention are included in the scope of the claims.

What is claimed is:

1. A secondary air regulating system for an exhaust purifying device of an internal combustion engine having an air intake passage and an exhaust passage in which said exhaust purifying device is disposed, which system in combination comprises:

secondary air supply means connected to a portion upstream of said exhaust purifying device in said exhaust passage for supplying secondary air into said portion;

a sensor disposed downstream of said exhaust purifying device in said exhaust passage for generating a first signal in response to a predetermined concentration of a predetermined component being sensed in exhaust gases discharged from said exhaust purifying device;

a controller electrically connected to said sensor for producing a second signal in response to said first signal from said sensor; and regulating means electrically connected to said controller and connected to said secondary air supply means for controlling said secondary air supply means in response to said second signal, whereby said secondary air supply means supplies the optimal amount of secondary air into the portion upstream of said exhaust purifying device in said exhaust passage, said regulating means comprising, a three way solenoid valve electrically connectable and respondable to said controller and communicating with said air passage in response to said second signal from said controller, said three-way solenoid valve including a solenoid coil electrically connected with said controller and provided with a bore inside thereof, said coil being variably energizable by either polarity of said second signal and the energizing magnitude of said second signal, an atmospheric chamber adjacent to said bore and provided with an air inlet port communicating with the atmosphere, a vacuum chamber adjacent to said atmospheric chamber through a partition wall having an opening therethrough and provided with a vacuum inlet port communicating with said air intake passage and a vacuum outlet port communicating with said diaphragm assembly, an elongate permanent magnet plunger slidably disposed in said bore inside of said solenoid coil, said plunger being reversably movable therein in dependence on the polarity of solenoid coil and in response to the energizing signal magnitude of said solenoid coil, biasing means biasing said plunger at both ends thereof for holding it at neutral position, and a needle valve integrated with said plunger and being movably disposed in said opening of said partition wall so as to determine the opening area of said opening in accordance with the movement of said plunger, a diaphragm assembly communicating with said air intake passage through said three-way solenoid valve for actuation by the vacuum regulated by said solenoid valve, and a relief valve mechanically connected to said diaphragm assembly, said relief valve communicating with said air supply means for control of said air supply means in response to said second signal from said controller.

2. A secondary air regulating system according to claim 1, in which said controller is further connected to a group of sensors which generate a group of signals, said signals representing operating conditions of said internal combustion engine.

3. A secondary air regulating system according to claim 1, in which said sensor includes an oxygen sensor for generating said first signal in response to the concentration of oxygen in the exhaust gases discharged from said exhaust purifying device.

* * * * *